United States Patent Office 3,183,233
Patented May 11, 1965

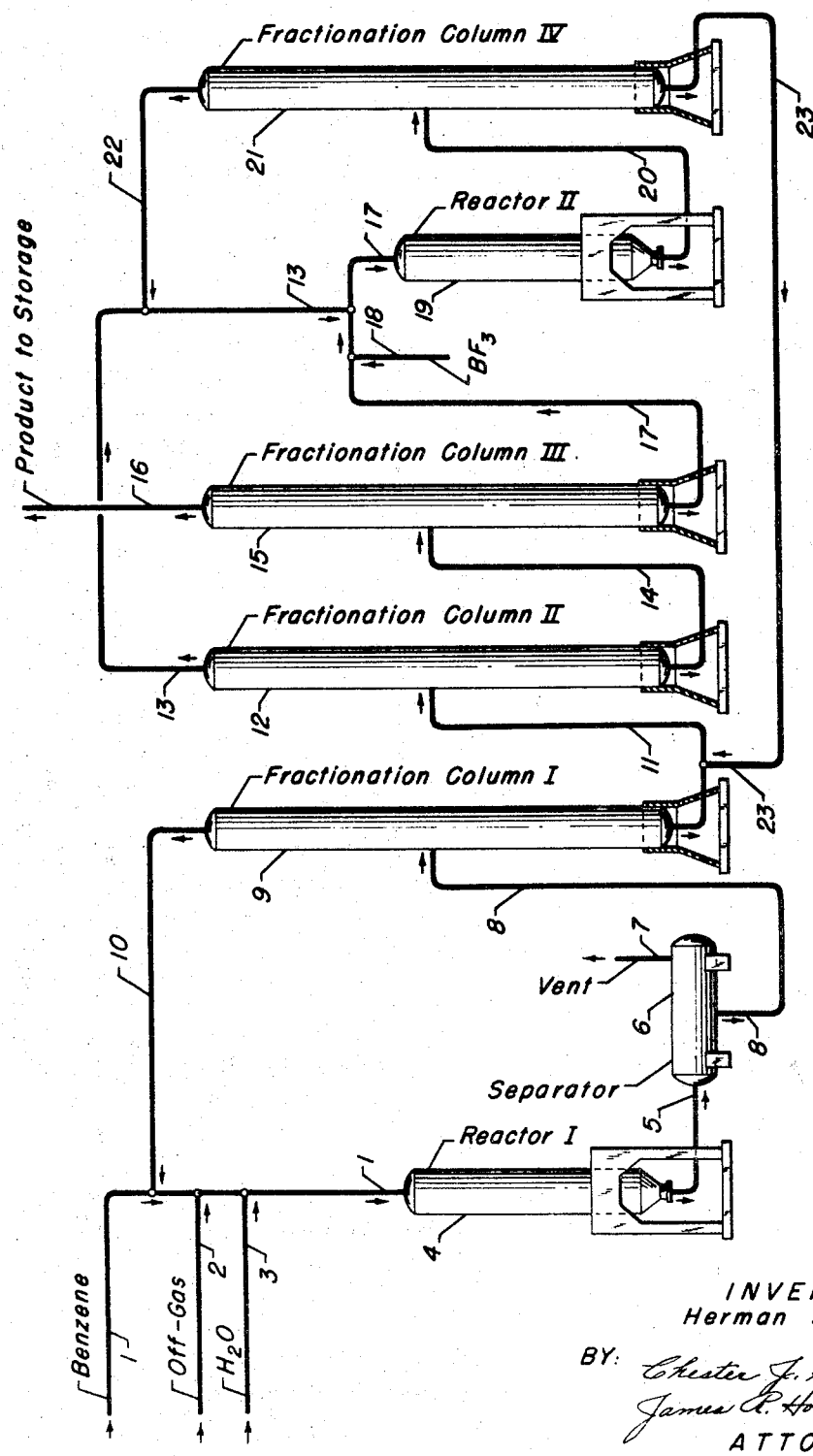

3,183,233
ALKYLATION-TRANSALKYLATION PROCESS
Herman S. Bloch, Skokie, Ill., assignor to Universal Oil Products Company, Des Plaines, Ill., a corporation of Delaware
Filed May 4, 1962, Ser. No. 192,428
15 Claims. (Cl. 260—671)

This invention relates to a process for the production of an aromatic compound, and more particularly relates to a process for the alkylation of an alkylatable aromatic compound with an olefin-acting compound, and still more particularly relates to the alkylation of an aromatic hydrocarbon with an olefinic hydrocarbon which may be in combination with other gases which are unreactive at the process conditions utilized. Further, this invention relates to a combination process including the steps of alkylation, transalkylation, gas-liquid separation and fractionation.

An object of this invention is to produce alkylated aromatic hydrocarbons, and more particularly, to produce monoalkylated benzene hydrocarbons. A specific object of this invention is a process for the production of ethylbenzene, a desired chemical intermediate, which ethylbenzene is utilized in large quantities in dehydrogenation processes for the manufacture of styrene, one of the starting materials for the production of resins and some synthetic rubber. Another specific object of this invention is to produce alkylated aromatic hydrocarbons boiling within the gasoline boiling range having high anti-knock value and which may be used as such or as a component of gasoline suitable for use in automobile and airplane engines. A further specific object of this invention is a process for the production of cumene by the reaction of benzene with propylene, which cumene product is oxidized in large quantities to form cumene hydroperoxide which is readily decomposed into phenol and acetone. Another object of this invention is to provide a process for the introduction of alkyl groups into aromatic hydrocarbons of high vapor pressure at normal conditions with minimum loss of said high vapor pressure aromatic hydrocarbons and maximum utilization thereof in the process. Still another object of this invention is a process in which molar excesses of aromatic hydrocarbons to be alkylated are utilized, and in which process the yield of monoalkylated aromatic hydrocarbon product is exceptionally high due to minimum production of polyalkylated aromatic hydrocarbon by-products in the process. The further object of maximum boron trifluoride utilization as a catalyst in a portion of this process, along with other objects of this invention, will be set forth hereinafter as part of the accompanying specification.

One embodiment of the present invention relates to a process for the production of an alkylaromatic compound which comprises alkylating an alkylatable aromatic compound with an olefin-acting compound in the presence of a regulated amount of water in an alkylation reaction zone containing a solid phosphoric acid catalyst, passing the effluent of said alkylation to a separation zone, separating from the separation zone unreactive gases and a liquid mixture comprising alkylatable aromatic compound, monoalkylated aromatic compound, polyalkylated aromatic compound and water, passing said liquid mixture to a first fractionation column, removing overhead from said first fractionation column an alkylatable aromatic compound-water azeotrope, recycling said azeotrope to the alkylation zone, passing as bottoms from said first fractionation column to a second fractionation column a substantially anhydrous mixture of alkylatable aromatic compound, monoalkylated aromatic compound and polyalkylated aromatic compound, removing overhead from said second fractionation column alkylatable aromatic compound, passing said alkylatable aromatic compound to a commingling step as hereinafter set forth, passing as bottoms from said second fractionation column to a third fractionation column monoalkylated aromatic compound in admixture with polyalkylated aromatic compound, removing overhead from said third fractionation column monoalkylated aromatic compound as product from the process, passing as bottoms from said third fractionation column to the commingling step polyalkylated aromatic compound, commingling the alkylatable aromatic compound from said second fractionation column with polyalkylated aromatic compound from said third fractionation column and with boron trifluoride, passing the effluent from said commingling step to a transalkylation reaction zone containing a boron trifluoride-modified substantially anhydrous inorganic oxide catalyst and therein reacting the polyalkylated aromatic compound with the alkylatable aromatic compound, passing the effluent of said transalkylation zone to a fourth fractionation column, removing overhead from said fourth fractionation column in admixture alkylatable aromatic compound and boron trifluoride, recycling said admixture to the commingling step, recycling the bottoms from said fourth fractionation column, comprising transalkylation products substantially free of boron trifluoride, to the second fractionation column.

A further embodiment of the present invention relates to a process for the production of an aromatic compound which comprises alkylating a benzene hydrocarbon with an olefinic hydrocarbon in the presence of a regulated amount of water in an alkylation reaction zone containing a solid phosphoric acid catalyst, passing the effluent of said alkylation zone to a separation zone, separating from the separation zone unreactive gases and a liquid mixture comprising alkylatable benzene hydrocarbon, monoalkylated benzene hydrocarbon, polyalkylated benzene hydrocarbon and water, passing said liquid mixture to a first fractionation column, removing overhead from said first fractionation column a benzene hydrocarbon-water azeotrope, recycling said azeotrope to the alkylation zone, passing as bottoms from said first fractionation column to a second fractionation column a substantially anhydrous mixture of alkylatable benzene hydrocarbon, monoalkylated benzene hydrocarbon and polyalkylated benzene hydrocarbon, removing overhead from said second fractionation column alkylatable benzene hydrocarbon, passing said alkylatable benzene hydrocarbon to a commingling step as hereinafter set forth, passing as bottoms from said second fractionation column to a third fractionation column monoalkylated benzene hydrocarbon in admixture with polyalkylated benzene hydrocarbon, removing overhead from said third fractionation column monoalkylated benzene hydrocarbon as product from the process, passing as bottoms from said third fractionation column to the commingling step polyalkylated benzene hydrocarbon, commingling the alkylatable benzene hydrocarbon from said second fractionation column with polyalkylated benzene hydrocarbon from said third fractionation column and with boron trifluoride, passing the effluent from said commingling step to a transalkylation reaction zone containing a boron trifluoride-modified substantially anhydrous inorganic oxide catalyst and therein reacting the polyalkylated benzene hydrocarbon with the alkylatable benzene hydrocarbon in the presence of from about 0.002 to about 1.2 grams of boron trifluoride per gram mol of polyalkylated benzene hydrocarbon, passing the effluent of said transalkylation zone to a fourth fractionation column, removing overhead from said fourth fractionation column in admixture alkylatable benzene hydrocarbon and boron trifluoride, recycling said admixture to the commingling step, and recycling the bottoms from said fourth fractionation column, comprising transalkylation products substantially free of boron trifluoride, to the second fractionation column.

A specific embodiment of the present invention relates to a process for the production of ethylbenzene which comprises alkylating benzene with a refinery off-gas containing a minor quantity of ethylene in the presence of a regulated amount of water in an alkylation reaction zone containing a solid phosphoric acid catalyst, passing the effluent of said alkylation zone to a separation zone, separating from the separation zone unreactive gases and a liquid mixture comprising benzene, ethylbenzene, polyethylbenzenes and water, passing said liquid mixture to a first fractionation column, removing overhead from said first fractionation column a benzene-water azeotrope, recycling said azeotrope to the alkylation zone, passing as bottoms from said first fractionation column to a second fractionation column a substantially anhydrous mixture of benzene, ethylbenzene and polyethylbenzenes, removing overhead from said second fractionation column benzene, passing said benzene to a commingling step as hereinafter set forth, passing as bottoms from said second fractionation column to a third fractionation column ethylbenzene in admixture with polyethylbenzenes, removing overhead from said third fractionation column ethylbenzene as product from the process, passing as bottoms from said third fractionation column to the commingling step polyethylbenzenes, commingling the benzene from said second fractionation column with polyethylbenzenes from said third fractionation column and with boron trifluoride, passing the effluent from said commingling step to a transalkylation reaction zone containing a boron trifluoride-modified substantially anhydrous alumina catalyst and therein reacting the polyethylbenzenes with the benzene, passing the effluent of said transalkylation zone to a fourth fractionation column, removing overhead from said fourth fractionation column in admixture benzene and boron trifluoride, recycling said admixture to the commingling step, and recycling the bottoms from said fourth fractionation column, comprising ethylbenzene substantially free of boron trifluoride, to the second fractionation column.

Other embodiments of the present invention will become apparent in considering the specification as hereinafter set forth.

This invention can be most clearly described and illustrated with reference to the attached drawing. While of necessity, certain limitations must be present in such a schematic description, no intention is meant thereby to limit the generally broad scope of this invention. As stated hereinabove, the first step of the process of the present invention comprises alkylating an alkylatable aromatic compound with an olefin-acting compound in the presence of a regulated amount of water in an alkylation reaction zone containing a solid phosphoric acid catalyst. In the drawing, this first step is represented as taking place in alkylation reaction zone 4, labeled reactor I. However, the mixture of alkylatable aromatic compound, olefin-acting compound and water must be furnished to this reaction zone. In the drawing, the alkylatable aromatic hydrocarbon is represented as being furnished to reaction zone 4 through line 1. The olefin-acting compound is represented as being furnished to reaction zone 4 through line 2 via line 1. The water is represented as being furnished to reaction zone 4 through line 3 via line 1.

Many aromatic compounds are utilizable as alkylatable aromatic compounds within the process of this invention. The preferred aromatic compounds are aromatic hydrocarbons, and the preferred aromatic hydrocarbons are monocyclic aromatic hydrocarbons, that is, benzene hydrocarbons. Suitable aromatic hydrocarbons include benzene, toluene, ortho-xylene, meta-xylene, para-xylene, ethylbenzene, ortho-ethyltoluene, meta-ethyltoluene, para-ethyltoluene, 1,2,3-trimethylbenzene, 1,2,4-trimethylbenzene, 1,3,5-trimethylbenzene, normal propyl-benzene, isopropylbenzene or cumene, normal butylbenzene, etc.

Higher molecular weight alkyl aromatic hydrocarbons are also suitable as starting materials and include aromatic hydrocarbons such as are produced by the alkylation of the aromatic hydrocarbons with olefin polymers. Such products are frequently referred to in the art as alkylate, and include hexylbenzenes, nonylbenzenes, dodecylbenzenes, pentadecylbenzenes, hexyltoluenes, nonyltoluenes, dodecyltoluenes, pentadecyltoluenes, etc. Very often alkylate is obtained as a high boiling fraction in which the alkyl group attached to the aromatic nucleus varies in size from about $C_9$ to $C_{18}$. Other suitable alkylatable aromatic hydrocarbons include those with two or more aryl groups such as diphenyl, diphenylmethane, triphenyl, triphenylmethane, fluorene, stilbene, etc. Examples of alkylatable aromatic hydrocarbons within the scope of this invention utilizable as starting materials and containing condensed aromatic rings include naphthalene, alkyl naphthalenes, anthracene, phenanthrene, naphthacene, rubene, etc. When the selected alkylated aromatic hydrocarbon is a solid, it may be heated by means not shown so that it passes as a liquid through line 1 as hereinafter described. Of the alkylatable aromatic hydrocarbons for use as starting materials in the process of this invention, the benzene hydrocarbons are preferred, and of the benzene hydrocarbons, benzene itself is particularly preferred.

The olefin-acting compound, particularly olefin hydrocarbon, which may be charged to reactor I through lines 2 and 1, may be selected from diverse materials including monoolefins, diolefins, polyolefins, acetylenic hydrocarbons, and also alcohols, ethers, and esters, the latter including alkyl halides, alkyl sulfates, alkyl phosphates, and various esters of carboxylic acids. The preferred olefin-acting compounds are olefinic hydrocarbons which comprise monoolefins containing one double bond per molecule and polyolefins which contain more than one double bond per molecule. Monoolefins which are utilized as olefin-acting compounds in the process of the present invention are either normally gaseous or normally liquid and include ethylene, propylene, 1-butene, 2-butene, isobutylene, and higher molecular weight normally liquid olefins such as various pentenes, hexenes, heptenes, octene and mixtures thereof, and still higher molecular weight liquid olefins, the latter including various olefin polymers having from about 9 to about 18 carbon atoms per molecule including propylene trimer, propylene tetramer, propylene pentamer, etc. Cycloolefins such as cyclopentene, methylcyclopentene, cyclohexene, methylcyclohexene, etc., may also be utilized. Also included within the scope of the olefin-acting compounds are certain substances capable of producing olefinic hydrocarbons or intermediates thereof under the conditions of operation utilized in the process. Typical olefin-producing substances or olefin-acting compounds capable of use include alkyl halides capable of undergoing dehydrohalogenation to form olefinic hydrocarbons and thus containing at least two carbon atoms per molecule. Examples of such alkyl halides include ethyl fluoride, n-propyl fluoride, isopropyl fluoride, n-butyl fluoride, isobutyl fluoride, sec-butyl fluoride, tert-butyl fluoride, etc., ethyl chloride, n-propyl chloride, isopropyl chloride, n-butyl chloride, isobutyl chloride, sec-butyl chloride, tert-butyl chloride, etc., ethyl bromide, n-propyl bromide, isopropyl bromide, n-butyl bromide, isobutyl bromide, sec-butyl bromide, tert-butyl bromide, etc. As stated hereinabove, other esters such as alkyl sulfates including ethyl sulfate, propyl sulfate, etc., and alkyl phosphates including ethyl phosphate, etc., may be utilized. Ethers such as diethyl ether, ethylpropyl ether, dipropyl ether, etc., are also included within the generally broad scope of the term olefin-acting compound and may be successfully utilized as alkylating agents in the process of this invention.

Olefin hydrocarbons, particularly normally-gaseous hydrocarbons, are the preferred olefin-acting compounds for use in the process of this invention and for passage by means of lines 2 and 1 to reactor I. The process of this invention may be successfully applied to and utilized for complete conversion of olefin hydrocarbons when these olefin hydrocarbons are present in minor quantities in various gas streams. Thus, the normally gaseous olefin for use in the process of this invention need not be concentrated. Such normally gaseous olefin hydrocarbons appear in minor quantities in various refinery gas streams, usually diluted with gases such as hydrogen, nitrogen, methane, ethane, propane, etc. These gas streams containing minor quantities of olefin hydrocarbons are obtained in petroleum refineries from various refinery installations including thermal cracking units, coking units, polymerization units, dehydrogenation units, etc. Such refinery gas streams have in the past often been burned for fuel value, since an economical process for the utilization of their olefin hydrocarbon content has not been available, or processes which have been suggested by the prior art required such extensive concentration of the olefinic hydrocarbons that they have not been economically feasible. This is particularly true for refinery gas streams known as off-gas streams containing relatively minor quantities of olefin hydrocarbons such as ethylene. Thus, it has been possible to catalytically polymerize propylene and/or butenes in the various refinery gas streams, but the off-gases from such processes still contain the utilizable olefin hydrocarbon, ethylene. In addition to containing ethylene in minor quantities, these off-gas streams contain other olefin hydrocarbons, depending upon their source, including propylene and butenes. A refinery off-gas ethylene stream may contain varying quantities of hydrogen, nitrogen, methane, and ethane with the ethylene in minor proportion, while a refinery off-gas propylene stream is normally diluted with propane and contains the propylene in minor quantity, and a refinery off-gas butene stream is normally diluted with butanes and contains the butenes in minor quantities. A typical analysis in mol percent for utilizable refinery off-gas from a catalytic cracking unit is as follows: nitrogen, 4.0%; carbon monoxide, 0.2%; hydrogen, 5.4%; methane, 37.8%; ethylene, 10.3%; ethane, 24.7%; propylene, 6.4%; propane, 10.7% and $C_4$ hydrocarbons, 0.5%. It is readily observed that the total olefin content of this gas stream is 16.7 mol percent and the ethylene content is even lower, namely 10.3%. Such gas streams containing olefin hydrocarbons in minor or dilute quantities are particularly preferred alkylating agents within the broad scope of this invention. It is readily apparent that only the olefin content of such streams undergoes reaction at alkylation conditions of the process, and that the remaining gases free from olefin hydrocarbons are vented from the process. The gases which do not react may be vented from the process with minimum loss of alkylatable aromatic compound due to their vapor pressure at the conditions of temperature and pressure utilized for venting the non-reactive gases.

As stated hereinabove, a regulated amount of water is added to alkylation reaction zone 4 (reactor I) conveniently by passage through lines 3 and 1. In order to substantially prevent loss of water from the catalyst and subsequent decrease in catalyst activities, an amount of water or water vapor such as steam is added to the charge so as to substantially balance the vapor pressure of the catalyst hereinafter described. This amount of water varies from about 0.1 to about 6% by volume of the organic material charged to the alkylation reaction zone.

Prior to passage to the alkylation zone, an alkylatable aromatic compound-water azeotrope is combined with the alkylatable aromatic compound via lines 10 and 1 as hereinafter set forth. Recycled unreacted alkylatable aromatic compound is available in the process since it is preferred to utilize a molar excess of alkylatable aromatic compound over olefin-acting compound, preferably olefin. This as disclosed in the prior art, has been found necessary to prevent side reactions from taking place such as, for example, polymerization of the olefin-acting compound prior to reaction thereof with the alkylatable aromatic compound and to direct the reaction principally to mono-alkylation. Any molar excess of alkylatable aromatic compound may be utilized, although best results are obtained when the alkylatable aromatic compound to olefin-acting compound molar ratio is from about 3:1 to about 20:1 or more. It is one of the features of this invention that an alkylatable aromatic compound-water azeotrope is available for recycle to the alkylation reaction zone.

Alkylation zone 4 is of the conventional type with a solid phosphoric acid catalyst disposed therein in the reaction zone. The alkylation zone may be equipped with heat transfer means, baffles, trays, heating means, etc. The alkylation reaction zone is preferably of the adiabatic type and thus feed to the alkylation zone will preferably be provided with the requisite amount of heat prior to passage thereof to said alkylation zone. The actual operation of the alkylation zone may be either upflow or downflow. As set forth hereinabove, the alkylation reaction zone is packed with a solid phosphoric acid catalyst. Solid phosphoric acid catalysts which may be utilized in the process of the present invention may be made by mixing an acid of phosphorus such as ortho-, pyro-, or tetra-phosphoric acid with a finely divided generally siliceous solid carrier (such as diatomaceous earth, prepared forms of silica, raw and acid-treated clays and the like) to form a wet paste; calcining at temperatures generally below about 500° C. to produce a solid cake; grinding and sizing to produce particles of usable mesh. If the calcination is carried out at temperatures above about 400° C., it may be desirable to rehydrate the catalyst granules at a temperature between about 200° and about 350° C., and preferably at about 260° C. to produce an acid composition corresponding to high alkylating activity. The catalyst preparation procedure may be varied by forming particles of the original paste, by extrusion, or by pelleting methods, after which the formed particles are calcined and, when necessary rehydrated.

In the reactions taking place during calcination, it has been shown that some acid is "fixed" on the carrier by formation of silicophosphoric acids, and it is probable that some meta-phosphoric acid, which is not as active under these conditions, may be formed. The rehydrating step produces an acid composition corresponding closely to the pyro-acid having the formula $H_4P_2O_7$. Unless rehydration is practiced, the temperature of approximately 300° C. should generally not be exceeded in the calcination step. A solid phosphoric acid catalyst prepared from a major proportion by weight of a phosphoric acid having at least as large a water content as that of the pyro-acid and a minor proportion of siliceous carrier such as kieselguhr is preferred for use in the present process.

The conditions utilized in reaction zone 4 may be varied over a relatively wide range. Thus, the desired alkylation reaction in the presence of the above indicated catalyst may be effected at a temperature of from about 0° or lower to about 375° C. or higher. The alkylation reaction is usually carried out at a pressure of from about substantially atmospheric, preferably from about 15 to about 200 atmospheres or more. The pressure utilized is usually selected to maintain the alkylatable aromatic compound in substantially liquid phase. However, within the above-mentioned temperature and pressure ranges, it is not always possible to maintain the olefin-acting compound in liquid phase. Thus, when utilizing a refinery off-gas containing ethylene as the olefin-acting compound, the ethylene will be dissolved in the liquid phase alkylatable aromatic compound (and alkylated aromatic compound as formed) to the extent governed by temperature, pressure, and solubility considerations. However, a portion thereof will always be in the gas phase. The hourly liquid space velocity of the liquid through the alkylation zone may be varied over a relatively wide range of from about 0.1 to about 20 or more.

When the alkylation reaction has proceeded to the desired extent, preferably with 100% conversion of the olefin-acting compound, the products from the alkylation zone, which may be termed alkylation zone effluent, pass from alkylation reaction zone 4 via line 5 to separation zone 6, labeled separator.

In separator 6, the unreactive gases and a liquid mixture comprising alkylatable aromatic compound, monoalkylated aromatic compound, polyalkylated aromatic compound and water are separated. The unreactive gases may be vented from the separator via line 7 and if entrained alkylatable aromatic compound is present in this stream, it may be scrubbed by any of several conventional methods including adsorption on silica gel or activated charcoal, absorption in a heavier oil such as polyalkylated benzenes, and the like. The liquid phase from the separator or last separator, if there is a series of separators, is passed via line 8 to fractionation column 9, labeled fractionation column I.

Fractionation column I is a conventional fractionator distillation column or tower and utilized for the purpose of separating an alkylatable aromatic compound-water azeotrope from the alkylation reaction zone effluent. The term "azeotrope" by way of definition and for the purpose of illustration only with no intention of unduly limiting the generally broad scope of this invention includes those mixtures of two or more liquid compounds whose boiling point does not change as vapor is generated and removed. Azeotropes may be classified in two groups: those which exist as one liquid phase (homogeneous azeotropes), and those which exist as two or more liquid phases (heterogeneous azeotropes). It is a feature of this invention that an alkylatable aromatic compound-water azeotrope is formed that cannot be completely resolved into its components by one simple fractionation at a given pressure. The alkylatable aromatic compound-water azeotrope formed passes overhead from fractionation column I via line 10 where it is combined with the alkylatable aromatic compound in line 1 and passed to the alkylation zone wherein that amount will be utilized again, or in combination with further added water and alkylatable aromatic compound to cause the alkylation reaction to go forward with retention of catalyst activity. In this manner, the column is operated so that virtually all of the water comes overhead together with at least a portion of the excess alkylatable aromatic compound and the column-bottoms are virtually water-free. The substantially anhydrous mixture of alkylatable aromatic compound, monoalkylated aromatic compound and polyalkylated aromatic compound is then passed to second fractionation zone 12, labeled fractionation column II, via line 11.

Second fractionation zone 12 is of the conventional type and is utilized for recovering of unreacted alkylatable aromatic compound from higher boiling homologs thereof. The unreacted alkylatable aromatic compound is withdrawn overhead from fractionation column 12 via line 13 and passed to a commingling step as hereinafter set forth. The monoalkylated aromatic compound in admixture with polyalkylated aromatic compound is passed as bottoms from the second fractionation column to a third fractionation column via line 14.

Third fractionation zone 15, labeled fractionation column III, is of the conventional type and is utilized for recovering of desired monoalkylated aromatic compound as product of the process. The desired monoalkylated aromatic compound is withdrawn overhead from fractionation column 15 via line 16 and passed as product to storage. The polyalkylated aromatic compound is removed as bottoms from said third fractionation column via line 17 and passed to the commingling step as hereinafter described.

The unreacted alkylatable aromatic compound from fractionation column II is commingled with polyalkylated aromatic compound from fractionation column III via line 13 and with boron trifluoride. In the drawing, the boron trifluoride is represented as being furnished to the commingling step via line 18. Boron trifluoride is a gas, boiling point −101° C., melting point −126° C., and is somewhat soluble in most organic solvents. It may be and generally is utilized per se by mere passage thereof as a gas through lines 18 and 17 so that it dissolves at least partially in the alkylatable aromatic compound and polyalkylated aromatic compound passing concurrently therewith through line 17. The boron trifluoride may also be added as a solution of the gas in a suitable organic solvent. However, in the utilization of such solutions, care must be exercised so that the selected solvent is unreactive with the alkylatable aromatic compound utilized in the process. Furthermore, boron trifluoride complexes with many organic compounds, particularly those containing sulfur or oxygen atoms. These complexes, while utilizable as catalysts, are very stable and thus will interfere with the recovery of boron trifluoride as hereinafter set forth. Therefore, a further limitation upon the selection of such a solvent is that it be free from atoms or groups which form complexes with boron trifluoride. The amount of boron trifluoride which is utilized is relatively small. It has been found that the amount necessary can be conveniently expressed as grams of boron trifluoride per gram mol of polyalkylated aromatic compound. This amount of boron trifluoride utilized in the transalkylation reaction zone is from about 0.002 to about 1.2 grams of boron trifluoride per gram mol of polyalkylated aromatic compound. When the amount of boron trifluoride present in the transalkylation zone is within the above expressed limit, substantially complete conversion of the polyalkylated aromatic compound to monoalkylated aromatic compound is obtained. Furthermore, the boron trifluoride then carries over from the fourth fractionation column to the transalkylation reaction zone as hereinafter described wherein that amount will be utilized again, or in combination with further added boron trifluoride, to cause the transalkylation reaction to go forward. Thus repeated use of the originally added quantity of boron trifluoride is obtained in this process.

Prior to passage to the transalkylation reaction zone, the alkylatable aromatic compound, polyalkylated aromatic compound, and boron trifluoride have combined therewith in line 17 recycled fractionated alkylatable aromatic compound via line 22 as hereinafter set forth. The effluent from said commingling step is passed via line 17 to transalkylation reaction zone 19, labeled reactor II.

Transalkylation zone 19 is of the conventional type with a boron trifluoride-modified inorganic oxide catalyst disposed therein in the reaction zone. The transalkylation zone may be equipped with heat transfer means, baffles, trays, heating means, etc. The transalkylation reaction zone is preferably of the adiabatic type and thus feed to the transalkylation zone will preferably be provided with the requisite heat prior to passage thereof to said transalkylation zone. The actual operation of the transalkylation zone may be either upflow or downflow. As set forth hereinabove, the transalkylation reaction zone is packed with a boron trifluoride-modified inorganic oxide catalyst. The inorganic oxide with which the zone is packed may be selected from diverse inorganic oxides including alumina, silica, boria, oxides of phosphorus, titanium dioxide, zirconium dioxide, chromia, zinc oxide, magnesia, calcium oxide, silica-alumina, silica-magnesia, silica-alumina-magnesia, silica-alumina-zirconia, chromia-alumina, alumina-boria, silica-zirconia, etc., and various naturally occurring inorganic oxides of various states of purity such as bauxite, clay (which may or may not have been previously acid treated), diatomaceous earth, etc. Of the above-mentioned inorganic oxides, gamma-alumina and theta-alumina are most readily activated by boron trifluoride, and thus the use of one or both of these boron trifluoride-modified aluminas is preferred. The modification of the inorganic oxide, particularly alumina, may be carried out prior to or simultaneous with the passage of the reactants containing boron trifluoride to the reactor. The exact manner in which the inorganic oxides are modified by boron trifluoride is not completely understood. However, it has been foound that the modification is preferably carried out at a temperature at least as high as that selected for use in the particular reaction zone, so that the catalyst in said zone will not exhibit an activity induction period. If the inorganic oxide is modified prior to use, this modification may be carried out in situ in the reactor or in a separate catalyst preparation step. More simply, this modification is accomplished by mere passage of boron trifluoride gas over a bed of the inorganic oxide maintained at the desired temperature. If the modification of the inorganic oxide with boron trifluoride is carried out during the passage of the reactant thereover, the catalyst will exhibit an induction period and thus complete transalkylation of the polyalkylated aromatic compounds will not take place for some hours, say up to 12 or more.

Since the conditions necessary for transalkylation are generally more severe than for alkylation, one effective means for increasing severity is by decreasing the liquid hourly space velocity of the feed to the transalkylation zone, thus increasing reaction zone severity. As was the case with the conditions utilized in the alkylation reaction zone, the conditions utilized in transalkylation reaction zone 19 may be varied over a relatively wide range, but, as set forth hereinabove, are usually of greater severity than prevail in the alkylation reaction zone. The transalkylation reaction may be effected at temperature of from about 100° C. to about 375° C. or higher and at a pressure of from about substantially atmospheric, preferably from about 15 p.s.i.g. to about 200 atmospheres. Here again, the pressure utilized is selected to maintain the alkylatable aromatic compound and polyalkylated aromatic compound in substantially liquid phase. Referring to the alkylatable aromatic compound, it is preferable to have present in the transalkylation reaction zone from about 1 to about 10 or more, sometimes up to 20, molar proportions to molar proportion of alkyl group in the polyalkylated aromatic hydrocarbon introduced therewith. The hourly liquid space velocity of the liquid through transalkylation reaction zone 19 may be varied over a relatively wide range of from about 0.1 to about 20 or more. When the transalkylation reaction has proceeded to the desired extent so that a sufficient quantity of polyalkylated aromatic compounds are converted to monoalkylated aromatic compounds by reaction with the alkylatable aromatic compound, the products from transalkylation zone 19 are withdrawn through line 20 with or without the intermediate use of a separator and passed to fourth fractionation zone 21, labeled fractionation column IV.

Fourth fractionation zone 21 is of the conventional type and is operated so that alkylatable aromatic compound and boron trifluoride in admixture are removed overhead from the column via line 22 and passed in admixture with the alkylatable aromatic hydrocarbon from fractionation column II via line 13 to the commingling step. Transalkylation reaction products substantially free of boron trifluoride are withdrawn via line 23 from fractionation column IV and passed via lines 23 and 11 to fractionation column II and the additional monoalkylated aromatic compound formed in transalkylation zone 19 is subsequently removed overhead from third fractionation column 15 as product of the process via line 16.

The following examples are introduced for the purpose of illustration with no intention of unduly limiting the generally broad scope of the present invention.

*Example I*

This example illustrates the process of the present invention for the production of ethylbenzene utilizing the flow scheme as shown in the drawing. In this example, benzene and ethylene (as a 53% concentrate) along with about 1 volume percent (of organic material charged) water are fed to the alkylation reaction zone containing a solid phosphoric acid catalyst comprising a calcined composite of a catalyticilly active acid of phosphorus and kieselguhr. The alkylation zone is maintained at a temperature of about 288° C. and a pressure of about 900 p.s.i.g. The effluent from the alkylation reaction zone is passed to a separation zone where the unreactive gases are vented from the process and a liquid mixture comprising benzene, ethylbenzene, polyethylbenzenes and water is separated. The liquid mixture is then passed to fractionation column I where a benzene-water azeotrope is removed overhead from the column and recycled to the alkylation zone. The substantially anhydrous bottoms comprising benzene, ethylbenzene and polyethylbenzenes from fractionation column I is then passed to fractionation column II. Benzene is removed overhead from fractionation column II and passed to a commingling step. The bottoms comprising ethylbenzene in admixture with polyethylbenzenes are taken from fractionation column II and passed to fractionation column III. The desired ethylbenezene product is removed as overhead from fractionation column III and the bottoms, comprising polyethylbenzenes, are passed to the commingling step. The benzene from fractionation column II and the polyethylbenzenes from fractionation column III are commingled along with about 0.20 gram of boron trifluoride per gram mol of polyethylbenzenes. The effluent from the commingling step is then passed to the transalkylation reaction zone containing a boron trifluoride-modified substantially anhydrous gamma-alumina and the polyethylbenzenes are therein reacted with the benzene at a temperature of about 202° C. and a pressure of about 500 p.s.i.g. The effluent of the transalkylation zone is then passed to fractionation column IV where benzene and boron trifluoride are removed overhead in admixture and recycled to the commingling step. The bottoms from fractionation column IV comprising boron trifluoride-free benzene and boron trifluoride-free ethylbenzene are passed to fractionation column II for recycle of benzene and ultimate recovery of the additional ethylbenzene formed.

In the test period illustrating the process of this invention, ethylene conversion starts out at nearly 100% and continues at or above 90% throughout the entire test. During the test, transalkylation of the polyethylbenzenes continues so that overall ethylbenzene yields based on benzene reacted approach the stoichiometric yields and continue at this high level. Simultaneously, as hereinabove mentioned, ethylene conversion of nearly 100% is recorded, based on ethylene fed to the plant, and substantially no catalyst deactivation is observed.

*Example II*

This example illustrates the process of the present invention for the production of ethylbenzene again utilizing the flow scheme as shown in the drawing. In this example, benzene and a synthetic off-gas consisting of about 13% ethylene and nitrogen along with about 0.8 volume percent (of organic material charged) water are fed to the alkylation reaction zone containing a solid phosphoric acid catalyst comprising a calcined composite of a catalytically active acid of phosphorus and a generally siliceous adsorbent. The alkylation zone is maintained at about 350° C. and a pressure of about 900 p.s.i.g. The effluent from the alkylation reaction zone is passed to a separation zone where the unreactive nitrogen is vented from the process and a liquid mixture comprising benzene, ethylbenzene, polyethylbenzenes and water is separated. The liquid mixture is then passed to fractionation column I where a benzene-water azeotrope is removed overhead from the column and recycled to the alkylation zone. The substantially anhydrous bottoms comprising benzene, ethylbenzene and polyethylbenzenes from fractionation column I are then passed to fractiontion column II. Benzene is removed overhead from fractionation column II and passed to a commingling step. The bottoms comprising ethylbenzene in admixture with polyethylbenzenes are taken from fractionation column II and passed to fractionation column III. The desired ethylbenzene product is removed as overhead from fractionation column III and the bottoms, comprising polyethylbenzenes, are passed to the commingling step. The benzene from fractionation column II and the polyethylbenzenes from fractionation column III are commingled along with about 1.10 gram of boron trifluoride per gram mol of polyethylbenzenes. The effluent from the commingling step is then passed to the transalkylation reaction zone containing a boron trifluoride-modified substantially anhydrous gamma-alumina and the polyethylbenzenes are therein reacted with the benzene at a temperature of about 100° C. and a pressure of about 530 p.s.i.g. The effluent of the transalkylation zone is then passed to fractionation column IV where benzene and boron trifluoride are removed overhead in admixture and recycled to the commingling step. The bottoms from fractionation column IV comprising boron trifluoride-free benzene and boron trifluoride-free ethylbenzene are passed to fractionation column II for recycle of the benzene and ultimate recovery of the additional ethylbenzene formed.

Again, ethylene conversion starts out at nearly 100% and continues at 95% or more throughout the entire test. Nearly complete transalkylation of the polyethylbenzenes continues so that ethylbenzene yields based on benzene reacted approach the stoichiometric yields and continue at this high level. Substantially no catalyst deactivation is observed.

I claim as my invention:

1. A process for the production of an aromatic compound which comprises alkylating an alkylatable aromatic compound with an olefin-acting compound in the presence of a regulated amount of water in an alkylation reaction zone containing a solid phosphoric acid catalyst, passing the effluent of said alkylation zone to a separation zone, separating from the separation zone unreactive gases and a liquid mixture comprising alkylatable aromatic compound, monoalkylated aromatic compound, polyalkylated aromatic compound and water, passing said liquid mixture to a first fractionation column, removing overhead from said first fractionation column an alkylatable aromatic compound-water azeotrope, recycling said azeotrope to the alkylation zone, passing as bottoms from said first fractionation column to a second fractionation column a substantially anhydrous mixture of alkylatable aromatic compound, monoalkylated aromatic compound and polyalkylated aromatic compound, removing overhead from said second fractionation column alkylatable aromatic compound, passing said alkylatable aromatic compound to a commingling step as hereinafter set forth, passing as bottoms from said second fractionation column to a third fractionation column monoalkylated aromatic compound in admixture with polyalkylated aromatic compound, removing overhead from said third fractionation column monoalkylated aromatic compound as product from the process, passing as bottoms from said third fractionation column to the commingling step polyalkylated aromatic compound, commingling the alkylatable aromatic compound from said second fractionation column with polyalkylated aromatic compound from said third fractionation column and with boron trifluoride, passing the effluent from said commingling step to a transalkylation reaction zone containing a boron trifluoride-modified substantially anhydrous inorganic oxide catalyst and therein reacting the polyalkylated aromatic compound with the alkylatable aromatic compound, passing the effluent of said transalkylation zone to a fourth fractionation column, removing overhead from said fourth fractionation column in admixture alkylatable aromatic compound and boron trifluoride, recycling said admixture to the commingling step, and recycling the bottoms from said fourth fractionation column, comprising transalkylation products substantially free of boron trifluoride, to the second fractionation column.

2. The process of claim 1 further characterized in that said alkylatable aromatic compound is an alkylatable aromatic hydrocarbon.

3. The process of claim 1 further characterized in that said alkylatable aromatic compound is a benzene hydrocarbon.

4. The process of claim 3 further characterized in that said transalkylation reaction zone contains from about 0.002 to about 1.2 grams of boron trifluoride per gram mol of polyalkylated aromatic compound.

5. The process of claim 4 further characterized in that said olefin-acting compound is an olefinic hydrocarbon.

6. The process of claim 4 further characterized in that said olefin-acting compound is a normally gaseous olefin.

7. The process of claim 6 further characterized in that said boron trifluoride-modified substantially anhydrous inorganic oxide is a boron trifluoride-modified substantially anhydrous alumina.

8. The process of claim 6 further characterized in that said boron trifluoride-modified substantially anhydrous inorganic oxide is gamma-alumina.

9. The process of claim 6 further characterized in that said boron trifluoride-modified substantially anhydrous inorganic oxide is theta-alumina.

10. A process for the production of ethylbenzene which comprises alkylating benzene with ethylene in the presence of a regulated amount of water in an alkylation reaction zone containing a solid phosphoric acid catalyst, passing the effluent of said alkylation zone to a separation zone, separating from the separation zone unreactive gases and a liquid mixture comprising benzene, ethylbenzene, polyethylbenzenes and water, passing said liquid mixture to a first fractionation column, removing overhead from said first fractionation column a benzene-water azeotrope, recycling said azeotrope to the alkylation zone, passing as bottoms from said first fractionation column to a second fractionation column a substantially anhydrous mixture of benzene, ethylbenzene and polyethylbenzenes, removing overhead from said second fractionation column benzene, passing said benzene to a commingling step as hereinafter set forth, passing as bottoms from said second fractionation column to a third fractionation column ethylbenzene in admixture with polyethylbenzenes, removing overhead from said third fractionation column ethylbenzene as product from the process, passing as bottoms from said third fractionation column to the commingling step polyethylbenzenes, commingling the benzene from said second fractionation column with polyethylbenzenes from said third fractionation column and with boron trifluoride, passing the effluent from said commingling step to a transalkylation reaction zone containing a boron trifluoride-modified substantially anhydrous alumina catalyst and therein reacting the polyethylbenzenes with the benzene, passing the effluent of said transalkylation zone to a fourth fractionation column, removing overhead from said fourth fractionation column in admixture benzene and boron trifluoride, recycling said admixture to the commingling step, and recycling the bottoms from said fourth fractionation column, comprising ethylbenzene substantially free of boron trifluoride, to the second fractionation column.

11. A process for the production of cumene which comprises alkylating benzene with propylene in the presence of a regulated amount of water in an alkylation reaction zone containing a solid phosphoric acid catalyst, passing the effluent of said alkylation zone to a separation zone, separating from the separation zone unreactive gases and a liquid mixture comprising benzene, cumene, polypropylbenzenes and water, passing said liquid mixture to a first fractionation column, removing overhead from said first fractionation column a benzene-water azeotrope, recycling said azeotrope to the alkylation zone, passing as bottoms from said first fractionation column to a second fractionation column a substantially anyhdrous mixture of benzene, cumene and polypropylbenzenes, removing overhead from said second fractionation column benzene, passing said benzene to a commingling step as hereinafter set forth, passing as bottoms from said second fractionation column to a third fractionation column cumene in admixture with polypropylbenzenes, removing overhead from said third fractionation column cumene as product from the process, passing as bottoms from said third fractionation column to the commingling step polypropylbenzenes, commingling the benzene from said second fractionation column with polypropylbenzenes from said third fractionation column and with boron trifluoride, passing the effluent from said commingling step to a transalkylation reaction zone containing a boron trifluoride-modified substantially anhydrous alumina catalyst and therein reacting the polypropylbenzenes with the benzene, passing the effluent of said transalkylation zone to a fourth fractionation column, removing overhead from said fourth fractionation column in admixture benzene and boron trifluoride, recycling said admixture to the commingling step, and recycling the bottoms from said fourth fractionation column, comprising cumene substantially free of boron trifluoride, to the second fractionation column.

12. A process for the production of butylbenzene which comprises alkylating benzene with a butene in the presence of a regulated amount of water in an alkylation reaction zone containing a solid phosphoric acid catalyst, passing the effluent of said alkylation zone to a separation zone, separating from the separation zone unreactive gases and a liquid mixture comprising benzene, butylbenzene, polybutylbenzenes and water, passing said liquid mixture to a first fractionation column, removing overhead from said first fractionation column a benzene-water azeotrope, recycling said azeotrope to the alkylation zone, passing as bottoms from said first fractionation column to a second fractionation column a substantially anhydrous mixture of benzene, butylbenzene and polybutylbenzenes, removing overhead from said second fractionation column benzene, passing said benzene to a commingling step as hereinafter set forth, passing as bottoms from said second fractionation column to a third fractionation column butylbenzene in admixture with polybutylbenzenes, removing overhead from said third fractionation column butylbenzene as product from the process, passing as bottoms from said third fractionation column to the commingling step polybutylbenzenes, commingling the benzene from said second fractionation column with polybutylbenzenes from said third fractionation column and with boron trifluoride, passing the effluent from said commingling step to a transalkylation reaction zone containing a boron trifluoride-modified substantially anhydrous alumina catalyst and therein reacting the polybutylbenzenes with the benzene, passing the effluent of said transalkylation zone to a fourth fractionation column, removing overhead from said fourth fractionation column in admixture benzene and boron trifluoride, recycling said admixture to the commingling step, and recycling the bottoms from said fourth fractionation column, comprising butylbenzene substantially free of boron trifluoride, to the second fractionation column.

13. A process for the production of ethylbenzene which comprises alkylating benzene with a refinery off-gas containing a minor quantity of ethylene in the presence of a regulated amount of water in an alkylation reaction zone containing a solid phosphoric acid catalyst, passing the effluent of said alkylation zone to a separation zone, separating from the separation zone unreactive gases and a liquid mixture comprising benzene, ethylbenzene, polyethylbenzenes and water, passing said liquid mixture to a first fractionation column, removing overhead from said first fractionation column a benzene-water azeotrope, recycling said azeotrope to the alkylation zone, passing as bottoms from said first fractionation column to a second fractionation column a substantially anhydrous mixture of benzene, ethylbenzene and polyethylbenzenes, removing overhead from said second fractionation column benzene, passing said benzene to a commingling step as hereinafter set forth, passing as bottoms from said second fractionation column to a third fractionation column ethylbenzene in admixture with polyethylbenzenes, removing overhead from said third fractionation column ethylbenzene as product from the process, passing as bottoms from said third fractionation column to the commingling step polyethylbenzenes, commingling the benzene from said second fractionation column with polyethylbenzenes from said third fractionation column and with boron trifluoride, passing the effluent from said commingling step to a transalkylation reaction zone containing a boron trifluoride-modified substantially anhydrous alumina catalyst and therein reacting the polyethylbenzenes with the benzene, passing the effluent of said transalkylation zone to a fourth fractionation column, removing overhead from said fourth fractionation column in admixture benzene and boron trifluoride, recycling said admixture to the commingling step, and recycling the bottoms from said fourth fractionation column, comprising ethylbenzene substantially free of boron trifluoride, to the second fractionation column.

14. The process of claim 1 further characterized in that the alkylation conditions are a temperature of from about 0° to about 375° C., a pressure of from about atmospheric to about 200 atmospheres, and a liquid hourly space velocity of from about 0.1 to about 20.

15. The process of claim 1 further characterized in that the transalkylation conditions are a temperature of from about 100° to about 375° C., a pressure of from about atmospheric to about 200 atmospheres, and a liquid hourly space velocity of from about 0.1 to about 20.

References Cited by the Examiner
UNITED STATES PATENTS

| 2,379,368 | 6/45 | Matuszak | 260—671 |
| 2,396,683 | 3/46 | Carmody et al. | 260—671 |
| 2,860,173 | 11/58 | Jones et al. | 260—671 |
| 2,995,611 | 8/61 | Linn et al. | 260—671 |

ALPHONSO D. SULLIVAN, *Primary Examiner.*

PAUL M. COUGHLAN, JR., *Examiner.*